(12) United States Patent
Yang et al.

(10) Patent No.: US 8,845,042 B2
(45) Date of Patent: Sep. 30, 2014

(54) BASE ASSEMBLY FOR SERVER COMPUTER HARD DRIVE DRAWER

(71) Applicant: EchoStreams Innovative Solutions, City of Industry, CA (US)

(72) Inventors: Chin-Hao Yang, New Taipei (TW); Hsiao-Fen Peng, New Taipei (TW); Chang-Feng Chu, Taoyuan County (TW); Chia-Hung Liu, New Taipei (TW); Mu-Chuan Wang, New Taipei (TW)

(73) Assignee: Echostreams Innovative Solutions, City of Industry, CA (US)

( * ) Notice: Subject to any disclaimer, the term of this patent is extended or adjusted under 35 U.S.C. 154(b) by 34 days.

(21) Appl. No.: 13/668,283

(22) Filed: Nov. 4, 2012

(65) Prior Publication Data

US 2013/0342092 A1   Dec. 26, 2013

(30) Foreign Application Priority Data

Jun. 20, 2012   (TW) .............................. 101211857 A

(51) Int. Cl.
A47B 95/02   (2006.01)
(52) U.S. Cl.
USPC ..................... 312/332.1; 312/348.6; 312/310; 312/222

(58) Field of Classification Search
USPC ............. 312/332.1, 333, 348.1, 348.4, 348.6, 312/310, 319.1, 215, 222; 292/137, 138, 292/163, 175, 173, 143, 1
See application file for complete search history.

(56) References Cited

U.S. PATENT DOCUMENTS

| | | | | |
|---|---|---|---|---|
| 4,955,678 | A * | 9/1990 | Kobayashi ................. | 312/332.1 |
| 6,775,144 | B2 * | 8/2004 | Gan et al. ....................... | 361/727 |
| 6,802,579 | B2 * | 10/2004 | Huw-Ching et al. ....... | 312/332.1 |
| 6,930,249 | B2 * | 8/2005 | Chen et al. ..................... | 174/50 |
| 8,328,246 | B2 * | 12/2012 | Zhang et al. .................... | 292/32 |

* cited by examiner

*Primary Examiner* — Daniel Rohrhoff
(74) *Attorney, Agent, or Firm* — Li & Cai Intellectual Property (USA) Office

(57) ABSTRACT

A base assembly includes a base plate, a pull-release handle, an extension member, a pivoting member, a cover plate and a latch member. The pull-release handle has a handle portion and defines a handle opening. The pull-release handle and the extension member are reciprocable in parallelism with a pulling direction on the base plate. The pivoting member has a force-receiving end and a force-transmitting end. The force-transmitting end is movable by the force-receiving end. The latch member has a locking strip and at least one locking portion. The force-transmitting end is connected to one end of the locking strip. The force-transmitting end works cooperatively with an elastic member, such that the locking strip and the locking portion are reciprocable in parallelism with a releasing direction.

7 Claims, 6 Drawing Sheets

BASE ASSEMBLY FOR SERVER COMPUTER HARD DRIVE DRAWER

BACKGROUND OF THE INVENTION

1. Field of the Invention

The instant disclosure relates to a base assembly structure for hard disk drive storage drawers; more particularly, to a base assembly having a latching member for computer server and storage systems' hard disk drive storage drawers.

2. Description of Related Art

In today's society, massive amounts of electronic data are generated and processed. To meet this condition, conventional computer server and storage systems are typically designed with emphasis on how to most effectively utilize available space for maximizing quantity of hard disk drives supported in the system.

Currently, the quantity of hard disk drives that can be supported by conventional designs with front-accessible hard disk drive bays have reached its limit. Therefore, an alternative drawer design has now been adopted to fully utilize the internal space for additional hard disk drives. However, when a drawer/rack is used to support a large amount hard disk drives, several potential risks may exist. For example, if a drawer is structurally unstable or mishandled by the user, the drawer may fall off and drop, and thus cause excessive damage to the hard disk drives and can even injure the operator.

Yet, the above described safety issue is often neglected by the manufacturers. The manufacturers tend to solely focus on increasing the drawer/rack capacity, while ignoring safety measures to prevent slipping and undesired disengagement. Furthermore, some of the existing drawer designs can be massive, which can cause the drawers to slip out of position, break the drawer rails, fall off, or hit surrounding objects when the user mishandles it during installation or usage, or in some cases even tip the rack cabinet forward due to the extension of the massive drawer weight. Therefore, how to improve the usage and maintenance practices of the drawers while increasing its safety are very important issues to be addressed.

To address the above issues, the inventors strive via industrial experience and academic research to present the instant disclosure, which can effectively improve the concerns described above.

SUMMARY OF THE INVENTION

The object of the instant disclosure is to provide a base assembly which is constructed with a base plate, a cover plate for the base plate to house latching members of a drawer and an outer shell enclosing the base assembly to form the drawer. The drawer is easy to operate, safe, and does not slip off.

The base assembly comprises a base plate, a pull-release handle, an extension member of the pull-release handle, a pivoting member, a latch member, and a cover plate. The base plate has two slotted openings, one is for the handle to slide within when being pulled or released, and one forms a channel for the extension member to slide within when the cover plate is attached. The pull-release handle is movably disposed on the bottom side of the base plate of the base assembly, and controls the latching and unlatching motion when being pulled upon or released. The pivoting member is disposed on the other end of the pull-release handle's extension member, and is pivotally disposed on the top side of the base plate. The pivoting member has a force-receiving end and a force-transmitting end. The force-receiving end connects to the pull-release handle's extension member, which then forms an angled portion and a notch and allows the pull-release handle to indirectly rotate and move the force-transmitting end of the pivoting member. The angled portion is pivotally connected to the top face of the base plate. The pulling and releasing of the pull-release handle moves the force-transmitting end reciprocatingly in parallelism. The latch member is movably disposed on the base plate to allow it to slide laterally. The latch member includes a locking strip, and the locking strip has at least one locking portion. The locking strip extends across the first slotted opening and is disposed on the top face. One end of the locking strip is connected to the force-transmitting end. The other end of the locking strip is connected to an elastic member. One end of the elastic member is connected to the top face of the base plate. The locking portion is disposed in the first slotted opening and faces in the same direction with the bottom face.

The instant disclosure also provides a tray to support the abovementioned base assembly. The tray has at least one third retaining member disposed thereon. The base assembly further defines a receiving region on the bottom face. The third retaining member functions cooperatively with the receiving region of the base assembly and the locking portion of the latch member.

The instant disclosure also provides a drawer. The drawer includes the abovementioned base assembly and at least four side walls that extend normally from respective sides thereof.

Based on the above, the utilization of the base assembly, the tray, and the drawer resolves the issue of pulling bulky drawers and eliminates the risks of drawers slipping out of position, falling off, hitting surrounding objects, or even dropping on the operator's foot. The instant disclosure enables the user to operate the drawer in an easy and safe manner.

DETAILED DESCRIPTION OF THE EMBODIMENTS

Figure 1A:
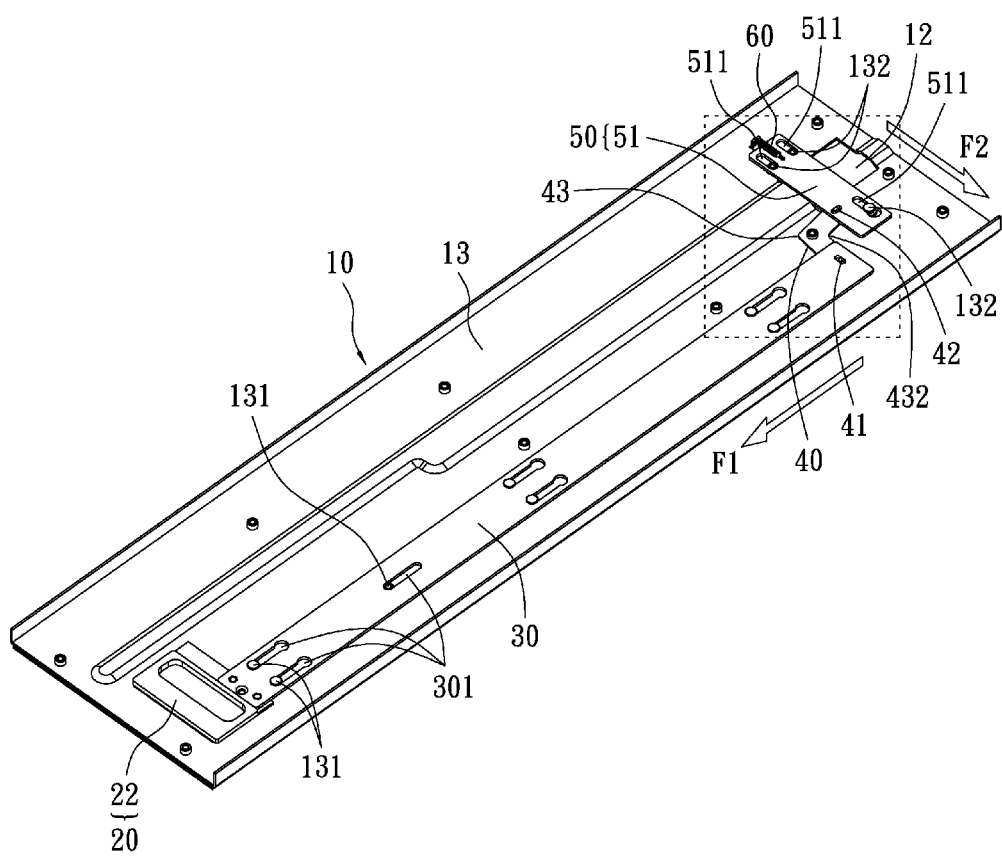
FIG. 1A is a schematic view showing the top face of a base assembly for a drawer of the instant disclosure.
Figure 1B:
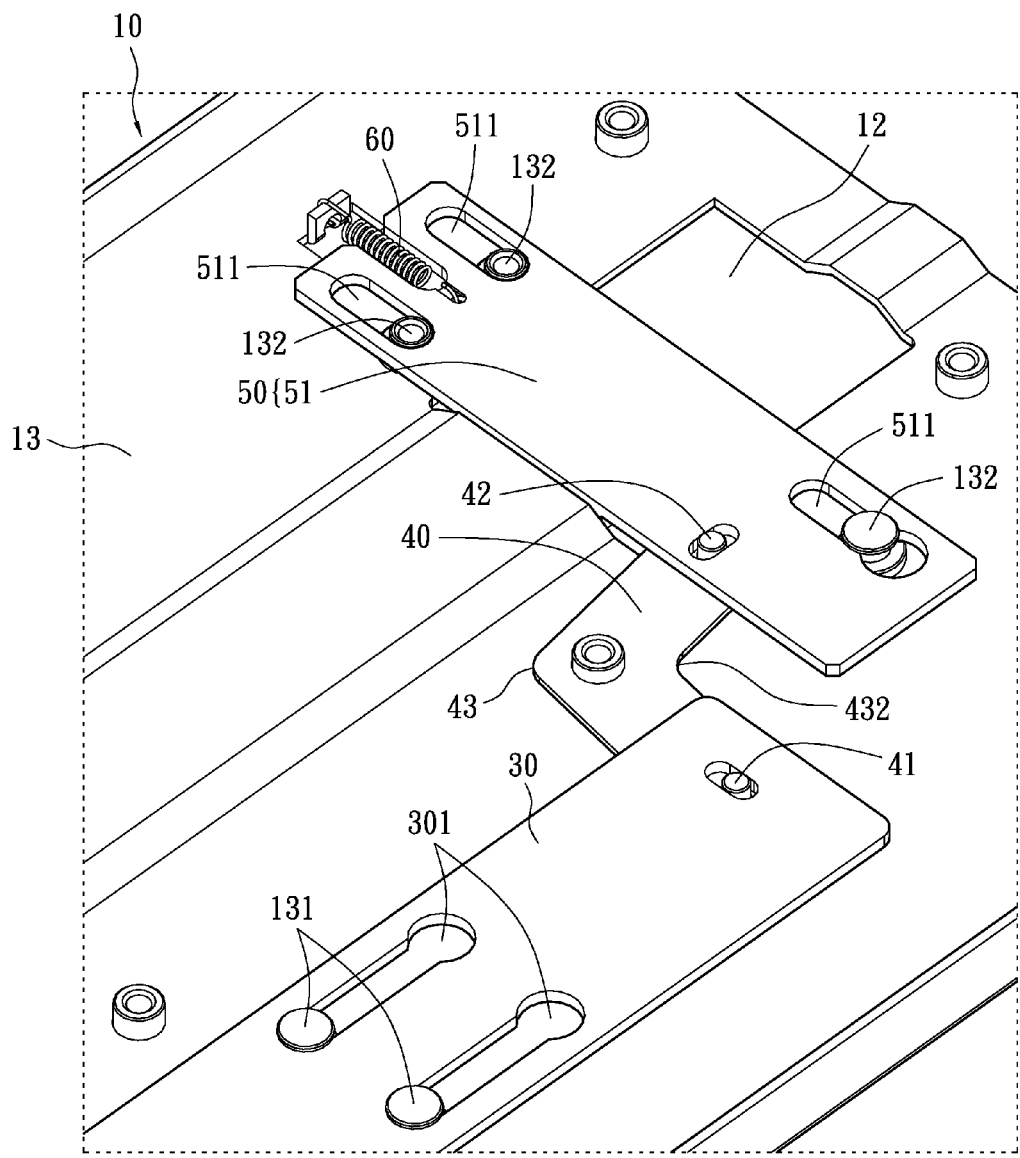
FIG. 1B is an enlarged view of the latch member disposed on the top face of the base assembly of the instant disclosure.

Please refer to FIGS. 1A~2B. The instant disclosure provides a base assembly of a hard drive storage drawer for computer servers. The base assembly comprises a base plate 10, a pull-release handle 20, an extension member 30 of the pull-release handle 20, a pivoting member 40, and a latch member 50.

The base plate 10 is formed with a first slotted opening 11 and a second slotted opening 12. The base plate 10 has a top face 13 and a bottom face 14.

Preferably, the pull-release handle 20 is a slotted plate-like piece, but is not restricted thereto. The pull-release handle 20 is movably disposed on the top face 13 of the base plate 10 and reciprocable in parallelism with a pulling direction F1. The pull-release handle 20 has a handle portion 22 and defines a handle opening 21. The pull handle opening 21 opens to the top and bottom faces 13 and 14.

Likewise, the extension member 30 is movably disposed on the top face 13 and reciprocable in parallelism with the pulling direction F1. One end of the extension member 30 is connected to the handle portion 22.

Preferably, the pivoting member 40 is angled and substantially plate-shaped, but is not restricted thereto. The pivoting member 40 is disposed on the top face 13 and has a force-receiving end 41 and a force-transmitting end 42. The force-receiving and force-transmitting ends 41 and 42 extend to connect with each other. The connection defines an angled portion 43 and a notch 432. The angled portion 32 is pivotally mounted on the top face 13. The force-receiving end 41 is connected to an opposite end of the extension member 30. The force-transmitting end 42 is movable by the force-receiving end 41 and reciprocable in parallelism with a releasing direction F2.

Preferably, the releasing direction F2 is substantially normal to the pulling direction F1. The notch 432 defines an angle (not labeled) that can be either an obtuse angle, a right angle, or an acute angle.

The latch member 50 or more specifically, a spring-latch member, is reciprocable in parallelism with the releasing direction F2 on the base plate 10. The latch member 50 has a locking strip 51 and a locking portion 52. The locking strip 51 straddles the first slotted opening 11 on the top face 13. One end of the locking strip 51 is connected to the force-transmitting end 42. Whereas the opposite end of the locking strip 51 is connected to one end of an elastic member 60, preferably a metal spring but not limited in. Whereas the opposite end of the elastic member 60 is mounted on the top face 13. The locking portion 52 and the bottom face 14 faces toward the same direction.

Preferably, a plurality of first retaining members 131 protrudes from the top face 13. The extension member 30 further defines a plurality of first slots 301 engaged by the first retaining members 131. Specifically, the first retaining members 131 are slidably retained in the first slots 301. All of the first slots 301 extend parallelly with the pulling direction F1. This configuration further assures the extension member 30 is reciprocable in parallelism with the pulling direction F1.

Preferably, the locking strip 51 is further formed with a plurality of second slots 511. The second slots 511 retain a plurality of second retaining members 132 protruding from the top face 13. The second slots 511 are formed extendingly along the releasing direction F2. The parallel arrangement assures the locking strip 51 is reciprocable in parallelism with the releasing direction F2.

Preferably, the elastic member 60 is arranged parallelly to the second slots 511. The parallel arrangement assures the elastic member 60 is capable of providing a restoring force oriented in a direction opposite of the releasing direction F2.

Preferably, one or more locking portions 52 are provided. As shown in FIG. 3A, a cover plate 70 may be arranged on the top face 13. Please refer to FIGS. 2A and 2B, which shows the bottom face 14 of the base plate 10. The bottom face 14 is formed with a receiving region 141 and an exit portion 142. The receiving region 141 is defined by a width W. The width W is dimensioned to accommodate the locking portion 52 that is disposed in the first slotted opening 11. The second slotted opening 12 is partly defined by a restricting edge 121 and communicates with the first slotted opening 11. The first slotted opening 11 and the second slotted opening 12 are arranged proximate to the receiving region 141 and the exit portion 142, respectively. The restricting edge 121 is also arranged proximate to the exit portion 142.

Figure 2A:
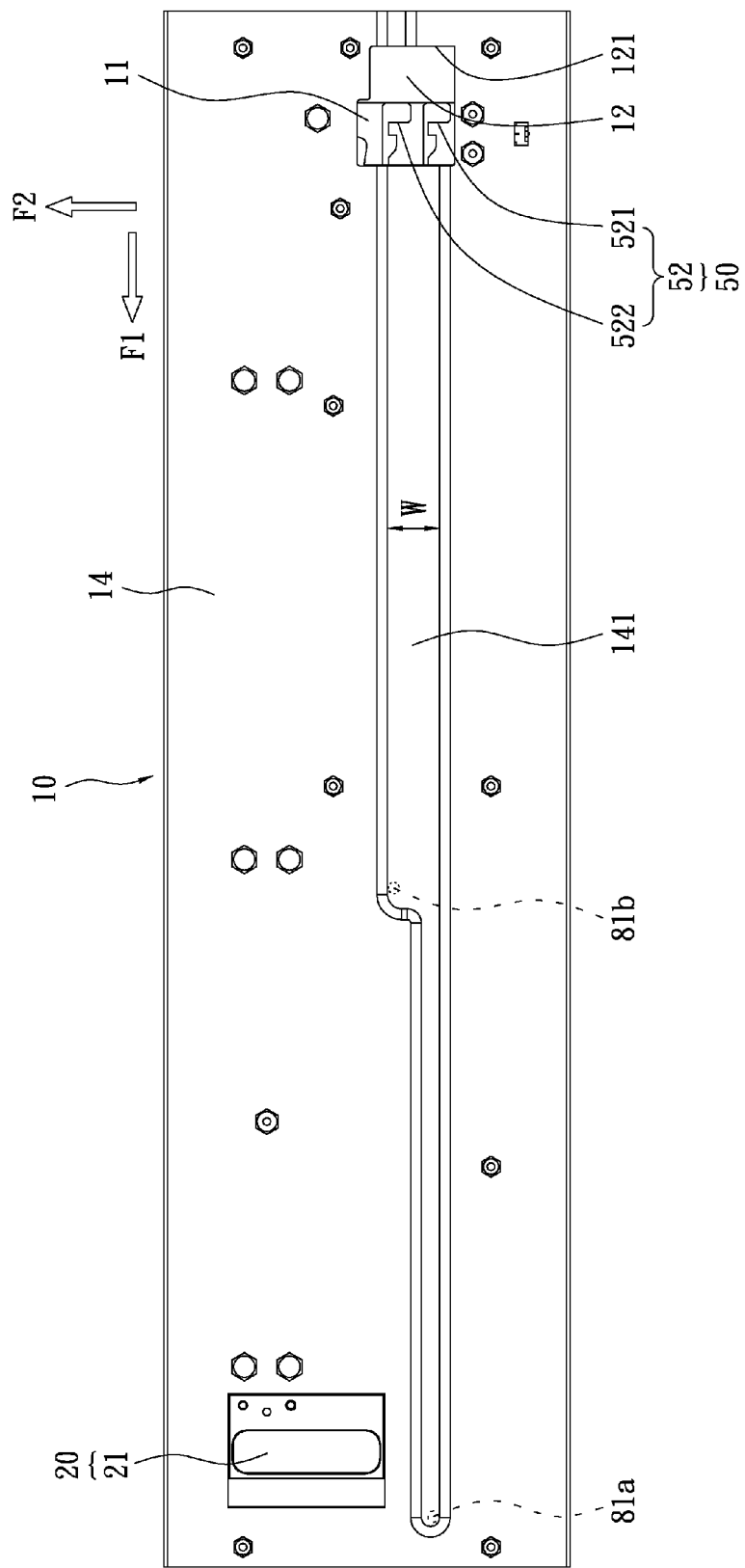
FIG. 2A is a plan view showing the bottom face of the base assembly of the instant disclosure.
Figure 2B:
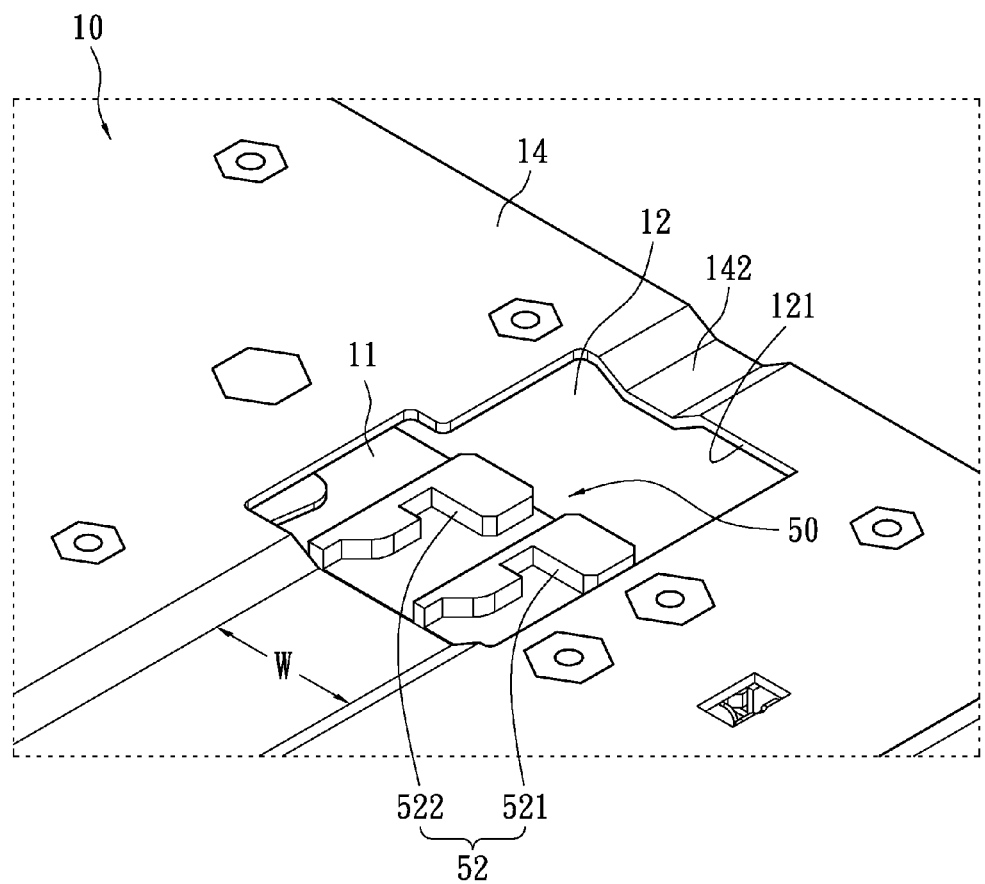
FIG. 2B is an enlarged view of a portion of the latch member when viewed from the bottom face.
Figure 3A:
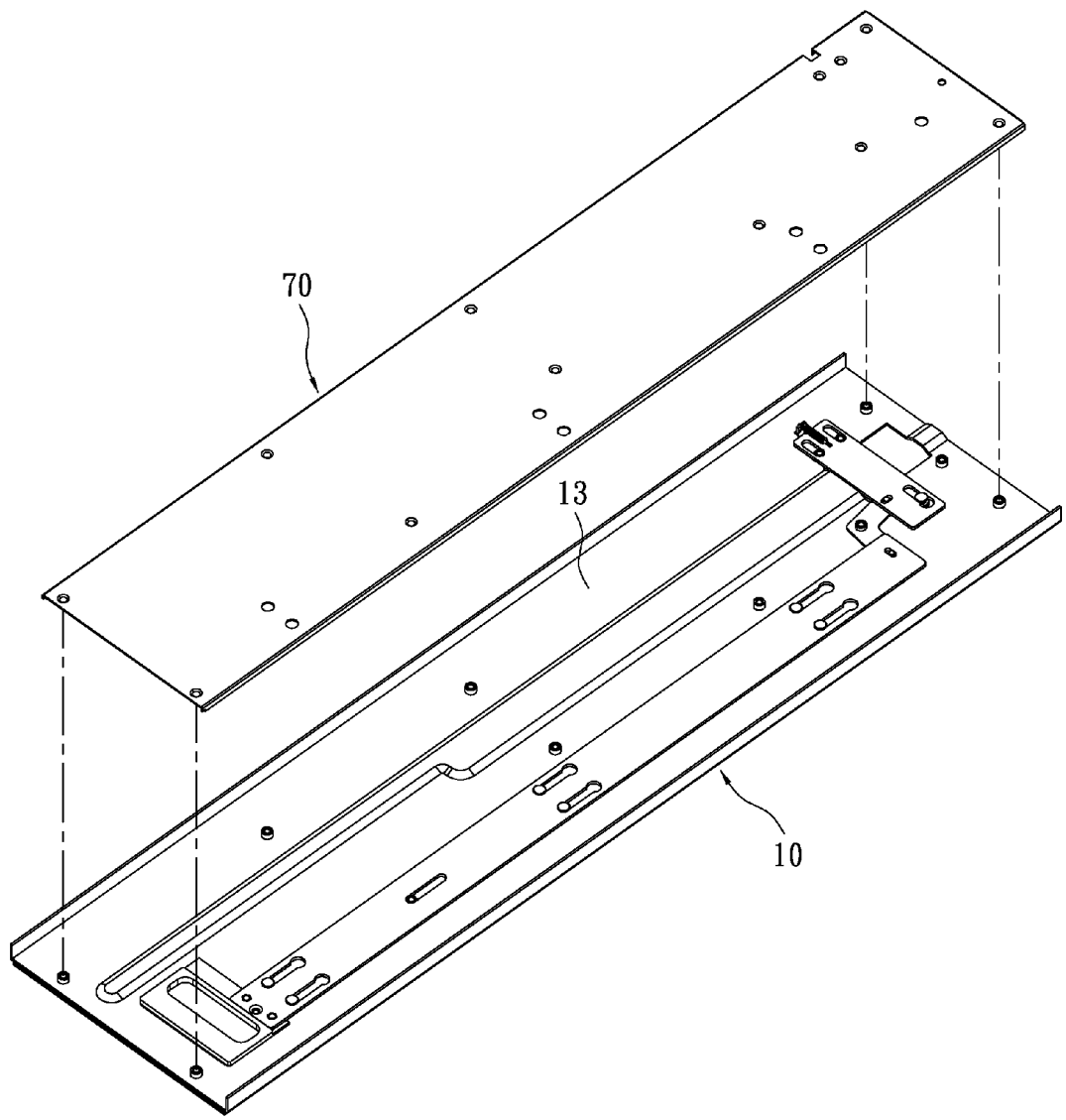
FIG. 3A is a perspective view showing the base assembly and the cover plate of the instant disclosure.
Figure 3B:
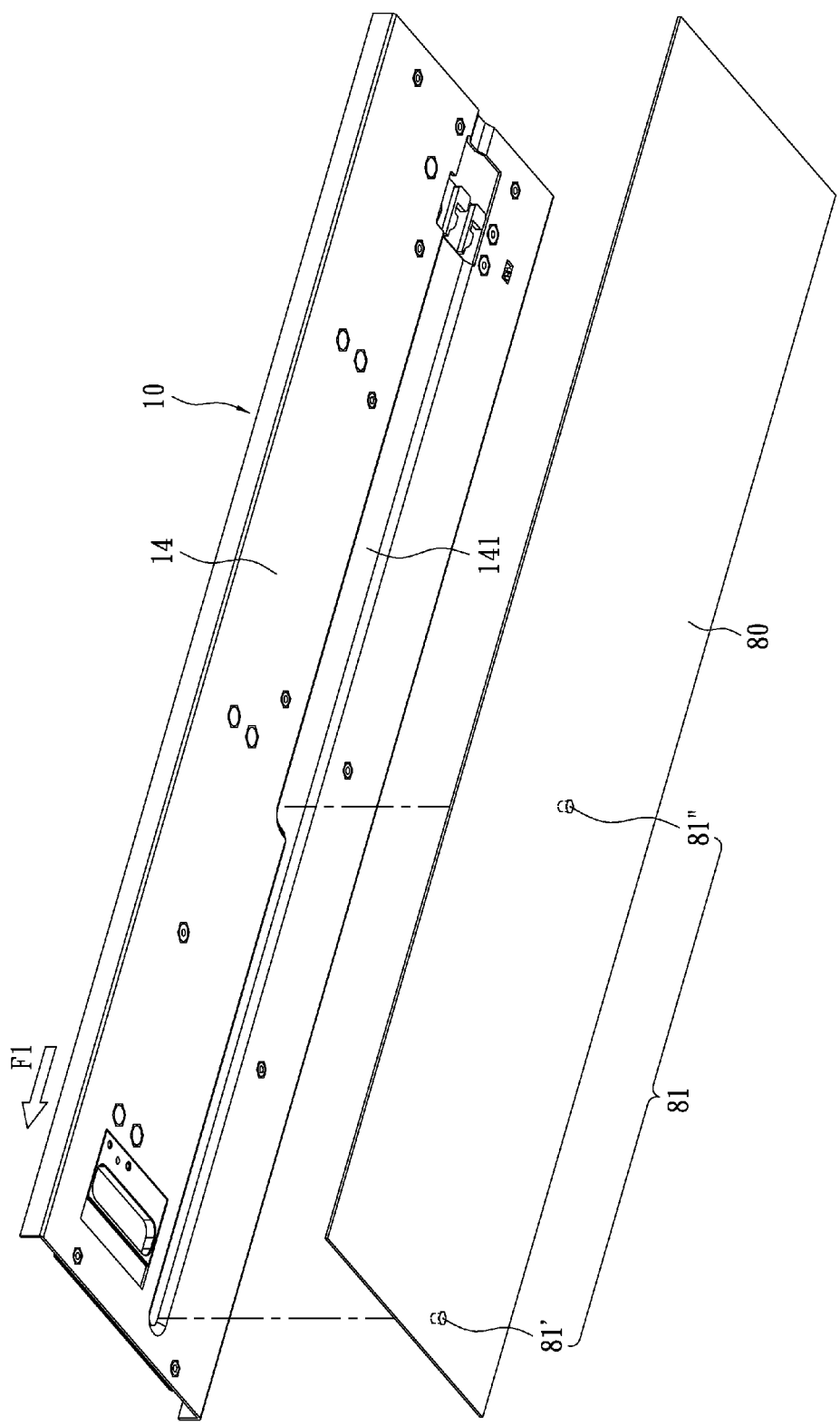
FIG. 3B is a perspective view showing the base assembly and a tray of the instant disclosure.

Please refer to FIGS. 2A, 2B, and 3B. Since more than one locking portion 52 is permitted, the illustrated embodiment shows two locking portions 52, namely, the first locking portion 521 and the second locking portion 522. The width W of the receiving region is dimensioned based on the number of the locking portions 52.

As shown in FIG. 3B, the instant disclosure also provides a tray 80 for supporting the above described base assembly. At least one third retaining member 81 is arranged on the tray 80. The third retaining member 81 is accommodated by the receiving region 141 and engageable to the locking portions 52.

To function with the first and second locking portions 521 and 522, as shown in FIG. 3B, two third retaining members 81 designated by the numerals 81' and 81" are protruded from the tray 80. For explaining purposes, as shown in FIG. 2A, the third retaining members 81' and 81" are represented by a first imaginary retaining member 81a and a second imaginary retaining member 81b, respectively. The first and second imaginary retaining members 81a and 81b in FIG. 2A show the positions of the third retaining members 81' and 81" in the receiving region 141, respectively, after the tray 80 is mounted to the bottom face 14. Please refer to FIGS. 2A and 3B. When the base plate 10 is moved toward the pulling direction F1, the second locking portion 522 is first engaged by the second imaginary retaining member 81b (i.e., the third retaining member 81" in FIG. 3B). The engagement provides a first restricting effect to prevent accidental slipping by the base assembly. In order to make the base assembly to move continuously toward the pulling direction F1, the user needs to operate the handle portion 22 via the handle opening 21 of the pull-release handle 20. Thus, the locking portions 52 are moved toward the releasing direction F2, as the second locking portion 522 is released from the second imaginary retaining member 81b.

As the base plate 10 continues to move in the pulling direction F1, the first locking portion 521 is engaged by the first imaginary retaining member 81a (i.e., the third retaining member 81' in FIG. 3B). Likewise, to move the base plate 10 continuously toward the pulling direction F1, the user would again operate the handle portion 22 via the handle opening 21 of the pull-release handle 20. Thus, the locking portions 52 are moved toward the releasing direction F2, as the first locking portion 521 is released from the first imaginary retaining member 81a.

Finally, the restricting edge 121 of the base plate 10 is stopped by the first imaginary retaining member 81a. To free the base plate 10, the user only needs to lift or tilt the base plate 10 slightly to release the restricting edge 121 from the first imaginary retaining member 81a. Thus, the base plate 10 is completely disengaged from the tray 80.

Based on the above description, the base assembly of the instant disclosure is provided with multiple means to prevent accidental slipping.

In conjunction with the above embodiment, the instant disclosure further provides a drawer (not shown). The drawer is constructed of the above described base assembly. More specifically, the drawer includes four side walls (not shown) arranged extendingly from the edges of the base plate 10.

Based on the foregoing, the base assembly supported by the tray and the drawer having the same of the instant disclosure utilize the latch member and retaining members. The latch member may be actuated and work cooperatively with the retaining members in providing multiple means to prevent the drawer from slipping out of position and facilitate the pulling operation by the user. The instant disclosure has industrial applicability, novelty, and non-obviousness in meeting patentability requirement and is submitted for examination.

What is claimed is:

1. A base assembly of a drawer, comprising:
a base plate defining a first slotted opening and a second slotted opening, the base plate having a top face and a bottom face;
a pull-release handle movably disposed on the base plate and reciprocable in parallelism with a pulling direction, the pull-release handle including a handle portion and defining a handle opening;
an extension member movably disposed on the top face and reciprocable in parallelism with the pulling direction, the extension member having one end connected to the handle portion;
a pivoting member pivotally disposed on the top face, the pivoting member having a force-receiving end and a force-transmitting end, the force-receiving end and the force-transmitting end being extended to connect with each other in defining an angled portion and a notch, the angled portion being pivotally connected to the top face, the force-receiving end being connected to an opposite end of the extension member, the force-transmitting end being reciprocable in parallelism with a releasing direction when moved by the force-receiving end; and
a latch member reciprocable in parallelism with the releasing direction and movably disposed on the base plate, the latch member having a locking strip and at least one locking portion, the locking strip being disposed on the top face and straddling the first slotted opening, the locking strip having one end connected to the force-transmitting end and another end elastically connected to one end of an elastic member, the elastic member having another end connected to the top face, the locking portion and the bottom face facing toward the same direction.

2. The base assembly of a drawer of claim 1, wherein a plurality of first retaining members and a plurality of second retaining members protrude from the top face, wherein a plurality of first slots is formed on the extension member and engaged by the first retaining members, and wherein the first slots extend in parallel with the pulling direction.

3. The base assembly of a drawer of claim 2, wherein a plurality of second slots is formed on the locking strip and engaged by the second retaining members, and wherein the second slots extend in parallel with the releasing direction.

4. The base assembly of a drawer of claim 3, wherein the elastic member is parallel with the second slots.

5. The base assembly of a drawer of claim 4, wherein the top face is engageable with a cover plate, wherein the bottom face further defines a receiving region and has an exit portion, the receiving region defines a width that is dimensioned to accommodate the locking portion, wherein the locking portion is disposed in the first slotted opening, wherein the second slotted opening is partly defined by a restricting edge and communicates with the first slotted opening, wherein the first slotted opening and the second slotted opening are proximate to the receiving region and the exit portion, respectively, and wherein the restricting end is proximate to the exit portion.

6. The base assembly of a drawer of claim 5, wherein the notch defines an obtuse angle, a right angle, or an acute angle.

7. A tray, for supporting the base assembly of claim 5, comprising: at least one third retaining member engaged to the receiving region and engageable to the locking portion.

* * * * *